United States Patent
Kinomura

(10) Patent No.: US 12,304,338 B2
(45) Date of Patent: May 20, 2025

(54) VEHICLE CHARGING SYSTEM AND METHOD OF CONTROLLING VEHICLE CHARGING SYSTEM

(71) Applicant: TOYOTA JIDOSHA KABUSHIKI KAISHA, Aichi-ken (JP)

(72) Inventor: Shigeki Kinomura, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 562 days.

(21) Appl. No.: 17/701,676

(22) Filed: Mar. 23, 2022

(65) Prior Publication Data

US 2022/0314828 A1 Oct. 6, 2022

(30) Foreign Application Priority Data

Mar. 31, 2021 (JP) .................. 2021-060823

(51) Int. Cl.
| | |
|---|---|
| *B60L 53/35* | (2019.01) |
| *B60L 53/30* | (2019.01) |
| *B60L 53/31* | (2019.01) |
| *H02J 7/02* | (2016.01) |

(52) U.S. Cl.
CPC .............. *B60L 53/35* (2019.02); *B60L 53/305* (2019.02); *B60L 53/31* (2019.02); *H02J 7/02* (2013.01)

(58) Field of Classification Search
None
See application file for complete search history.

(56) References Cited

U.S. PATENT DOCUMENTS

| | | | |
|---|---|---|---|
| 2010/0013434 A1 | 1/2010 | Taylor-Haw et al. | |
| 2015/0362979 A1* | 12/2015 | Wu ................ | G06F 1/3234 |
| | | | 345/173 |
| 2020/0324661 A1* | 10/2020 | Freeling-Wilkinson ............ | |
| | | | B60L 53/35 |
| 2021/0252989 A1* | 8/2021 | Price .............. | B60L 53/31 |

FOREIGN PATENT DOCUMENTS

| | | |
|---|---|---|
| CN | 103568857 A | 2/2014 |
| CN | 111433074 A | 7/2020 |
| JP | 2012-100448 A | 5/2012 |
| JP | 2012-196106 A | 10/2012 |
| JP | 5475407 B2 | 4/2014 |
| WO | 2019/073271 A1 | 4/2019 |

* cited by examiner

*Primary Examiner* — Julian D Huffman
*Assistant Examiner* — Sadia Kousar
(74) *Attorney, Agent, or Firm* — HAUPTMAN HAM, LLP

(57) ABSTRACT

A charging system includes a movable unit, a elevating unit, an interface (key portion), and a controller. The movable unit includes a charging connector connectable to a vehicle. The elevating unit lifts up/down the movable unit between a state in which the movable unit is accommodated under the ground and a state in which the movable unit is exposed on the ground and the charging connector1 and the vehicle are connectable to each other. Via the interface, information is input and output between a user and the charging system. The controller controls the elevating unit to lift up/down the movable unit when a condition for receiving a lifting operation via the interface is satisfied and the lifting operation is received.

8 Claims, 7 Drawing Sheets

VEHICLE CHARGING SYSTEM AND METHOD OF CONTROLLING VEHICLE CHARGING SYSTEM

This nonprovisional application is based on Japanese Patent Application No. 2021-060823 filed on Mar. 31, 2021 with the Japan Patent Office, the entire contents of which are hereby incorporated by reference.

BACKGROUND

Field

The present disclosure relates to a vehicle charging system and a method of controlling the vehicle charging system.

Description of the Background Art

Vehicles capable of so-called plug-in charging by electric power supplied from the outside of the vehicle are becoming widespread. A charging facility for plug-in charging is generally installed in a parking lot or the like, but occupies a certain degree of installation space. Therefore, a technique has been proposed in which a charging system is movable and accommodated under the ground. For example, a charging ball disclosed in Japanese Patent No. 5475407 is configured to be able to rise from the ground and to be able to be in a state of being accommodated under the ground.

SUMMARY

In a movable type charging system, the movable unit may be unnecessarily lifted up/down due to mischief or the like by an outsider other than the user of the vehicle.

The present disclosure has been made to solve the above-described problem, and an object of the present disclosure is to suppress a movable unit from being unnecessarily lifted up/down in a movable type charging system.

(1) A charging system for a vehicle according to a certain aspect of the present disclosure includes a movable unit, a lifting device, an interface, and a controller. The movable unit includes a power transmitting unit that transmits power to the vehicle. The lifting device lifts up/down the movable unit between a state in which the movable unit is accommodated under a ground and a state in which the movable unit is exposed on the ground. Via the interface, information is input and output between a user and the charging system. The controller controls the lifting device to lift up/down the movable unit when a condition for receiving a lifting operation via the interface is satisfied and the lifting operation is received.

(2) The interface includes a key portion operated to be on/off using a key of the user. The condition includes a condition that the key portion is operated to be on by the user.

(3) The interface includes a communication device that acquires information of an operation on the mobile terminal by the user. The condition includes a condition that the mobile terminal is located within a predetermined distance from the charging system.

In each of the above-described configurations of (1) to (3), when the condition for receiving the lifting operation via the interface is satisfied, the movable unit is lifted up/down. That is, when the above condition is not satisfied, the movable unit is suppressed from being lifted up/down even if the lifting operation is received. Therefore, according to the above configurations of (1) to (3), the movable unit can be suppressed from being unnecessarily lifted up/down.

(4) In a method of controlling a charging system for a vehicle according to another aspect of the present disclosure, the charging system includes a movable unit including a power transmitting unit that transmits power to the vehicle, and a lifting device that lifts up/down the movable unit between a state in which the movable unit is accommodated under a ground and a state in which the movable unit is exposed on the ground. The method includes lifting up/down the movable unit up and down when a condition for receiving a lifting operation via an interface is satisfied and the lifting operation is received.

According to the method of (4), as with the configuration of (1), the movable unit can be suppressed from being unnecessarily lifted up/down.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
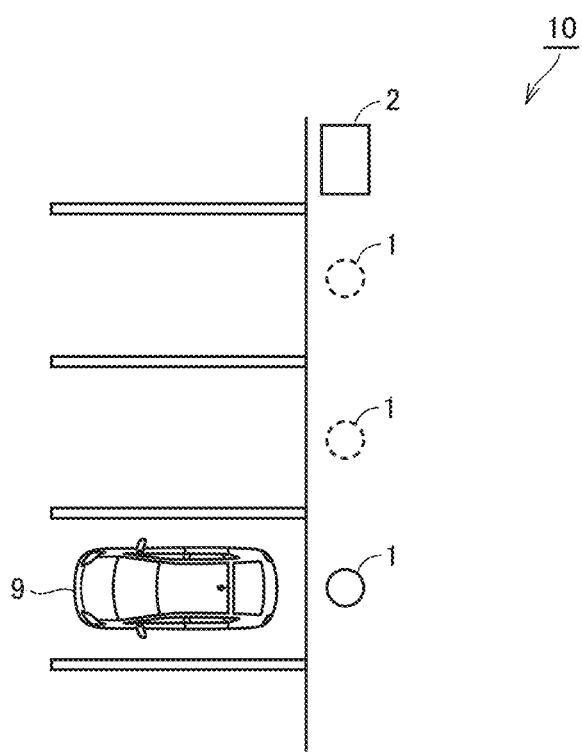
FIG. 1 is a diagram showing an example of a layout of a charging system of a vehicle according to a first embodiment.

Hereinafter, embodiments of the present disclosure will be described in detail with reference to the drawings. In the drawings, the same or corresponding portions are denoted by the same reference numerals, and the description thereof will not be repeated.

Embodiment 1

<Configuration of Charging System>

FIG. 1 is a diagram showing an example of a layout of a charging system of a vehicle according to a first embodiment. FIG. 1 shows a state in which one vehicle 9 is parked in one of a plurality of parking spaces provided in a parking lot.

The charging system 10 includes a plurality of charging stations 1 and an operation unit 2. Each of the plurality of charging stations 1 is installed in a space (e.g., a walkway) adjacent to the parking space. The number of the charging stations 1 is not particularly limited. The number of the charging stations 1 may be one. The operation unit 2 accepts a user operation for a plurality of charging stations 1.

The charging system 10 is configured such that the user can move up and down (move in the vertical direction) the charging station 1 to be operated between the "accommodated state" and the "exposed state" by controlling the operation unit 2. The "accommodated state" is a state in which the charging station 1 is accommodated under the ground t. The "exposed state" is a state of being exposed on the ground. In FIG. 1, a charging station 1 exposed on the ground is indicated by a solid line, and a charging station 1 accommodated under the ground is indicated by a broken line.

Figure 2:
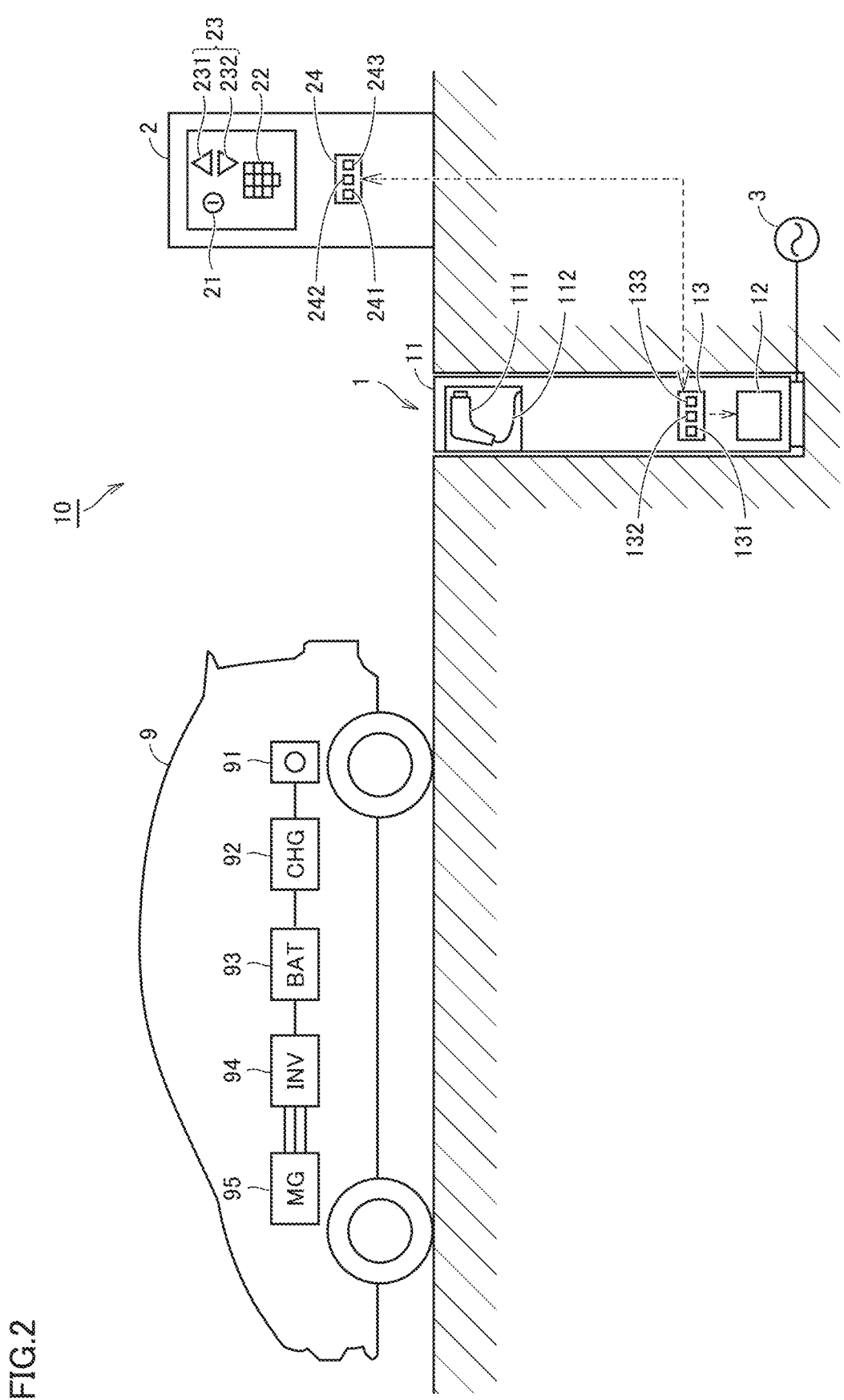
FIG. 2 is a diagram showing an example of a configuration of a charging station accommodated under ground, an operating device, and a vehicle.
Figure 3:
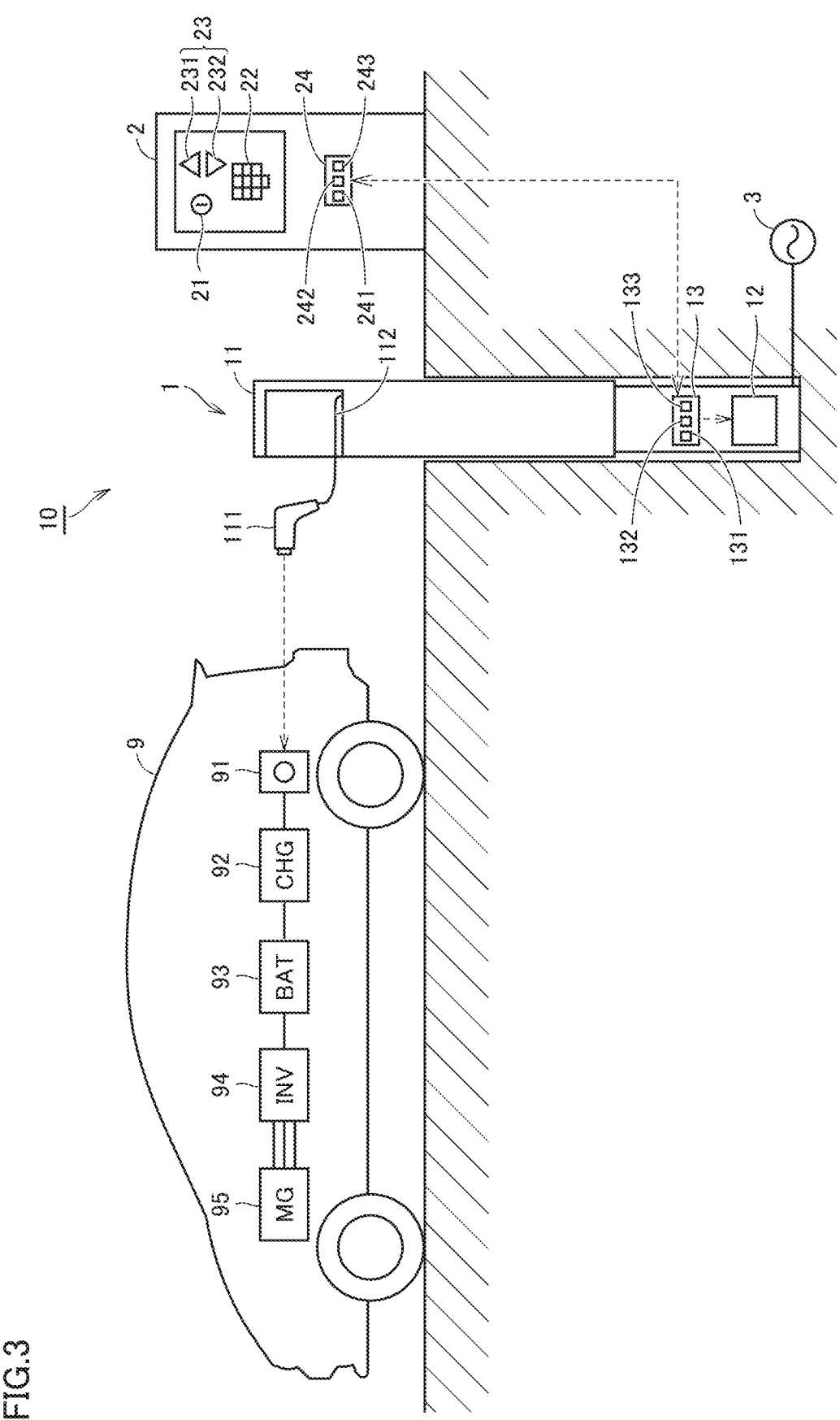
FIG. 3 is a diagram showing an example of a configuration of a charging station exposed on the ground, an operating device, and a vehicle.

FIG. 2 is a diagram showing an example of the configurations of the charging station 1 accommodated under the ground, the operation unit 2, and the vehicle 9. FIG. 3 is a diagram showing an example of the configuration of the charging station 1 exposed on the ground, the operation unit 2, and the vehicle 9. As shown in FIG. 2, the accommodated state is a state in which the charging station 1 is lowered until the upper end of the charging station 1 becomes substantially the same height as the ground. As shown in FIG. 3, the exposed state is a state in which the upper end of the charging station 1 is raised to a predetermined height on the ground.

The charging station 1 is configured to allow plug-in charging of the vehicle 9. The charging station 1 has, for example, a cylindrical casing. The charging station 1 is installed on a bottom surface of a recess formed in the ground. The concave portion is formed so as to have a predetermined gap with the outer peripheral surface of the housing of the charging station 1. The depth of the concave portion is approximately equal to the vertical length of the charging station 1 in the accommodated state. The charging station 1 includes a movable unit 11, an elevating unit (lifting device) 12, and a controller 13.

The movable unit 11 is configured to be movable up and down. The up-and-down direction of the movable unit 11 is the vertical direction in this example, but may be inclined by a predetermined angle from the vertical direction. The movable unit 11 includes a charging connector 111 and a charging cable 112. The charging connector 111 and the charging cable 112 can be accommodated in an accommodation space provided in an upper portion of the movable unit 11.

The charging connector 111 is connected to an inlet 91 (described later) of the vehicle 9. The charging connector 111 is electrically connected to one end of the charging cable 112. A power supply 3 is electrically connected to the other end of the charging cable 112. The power supply 3 is, for example, an AC power supply such as a commercial power supply. A power converter (not shown) may be provided between the charging cable 112 and the power supply 3. The charging cable 112 can extend and contract to and from the inlet 91 when the user removes the charging connector 111 from the accommodation space. The charging connector 111 is an example of the "power transmitting unit" according to the present disclosure.

The elevating unit 12 is fixed to a bottom surface of a recess formed in the ground. The elevating unit 12 raises and lowers the movable unit 11 between the accommodated state and the exposed state. Various mechanisms can be employed for the elevating unit 12. Specifically, the elevating unit 12 may have a rack-and-pinion mechanism, a mechanism using a hydraulic cylinder, or a magnetic mechanism. The rack-and-pinion mechanism raises and lowers the movable portion 11 by rotating a pinion gear meshed with a rack gear fixed to the movable portion 11. The electric actuator rotates the pinion gear. A mechanism using a hydraulic cylinder includes a rod fixed to a piston and a cylinder body. The rod is fixed to the movable portion 11. Then, the movable portion 11 is raised and lowered by increasing and decreasing the hydraulic pressure supplied to the cylinder body. The magnetic force mechanism raises and lowers the movable unit 11 by generating a repulsive force due to a magnetic force between the movable unit 11 and the elevating unit 12.

The elevating unit 12 preferably includes a mechanism (such as a stopper) that restricts excessive movement of the movable unit 11 in the vertical direction. Thus, the elevating unit 12 is configured such that the movable unit 11 does not move downward beyond the position corresponding to the accommodated state, and such that the movable unit 11 does not move upward beyond the position corresponding to the exposed state. The elevating unit 12 corresponds to the "elevating/lowering device" according to the present disclosure.

The controller 13 includes a processor 131 such as a CPU (Central Processing Unit), a memory 132 such as a ROM (Read Only Memory) and a RAM (Random Access Memory), and a communication module (communication device) 133 capable of performing wired and/or wireless communication with external devices of the charging station 1. In the present embodiment, the communication module 133 is configured to exchange various kinds of information (information related to a user operation accepted by the operation unit 2) with the operation unit 2. The communication module 133 may be configured to communicate with a management server (not shown) and/or another charging station 1.

The controller 13 controls constituent devices (such as the elevating unit 12) of the charging station 1 based on information stored in the memory 132, information received via the communication module 133, and/or information acquired from sensors (not shown). The controller 13 executes a "up control" for raising the movable unit 11 and a "down control" for lowering the movable unit 11. The execution condition of the UP control includes the condition that the charging station 1 is in the accommodated state and the condition that the ascending request is received from the operation unit 2. The execution condition of the DOWN control includes a condition that the charging station 1 is in an exposed state and a condition that a DOWN request is received from the operation unit 2. These conditions will be described in detail with reference to FIG. 4. The controller 13 corresponds to the "control device" according to the present disclosure.

The operation unit 2 accepts various user operations on the charging station 1. The operation unit 2 includes a key portion 21, a selection button 22, an operation button 23, and a controller 24.

The key portion 21 is turned on or off using a key (physical key) of the user. When the user performs the ON operation using the key, other operations on the selection button 22 and the operation button 23 are accepted. On the other hand, the operation on the selection button 22 and the operation button 23 is not accepted until the user performs the ON operation using the key (that is, during the OFF operation).

The selection button 22 accepts an operation in which the user selects a charging station 1 to be used from among a plurality of charging stations 1. For example, a different number is assigned to each of the plurality of charging stations 1, and the number is drawn in the parking space. The selection button 22 is configured so that the user can input the number of the charging station 1.

The operation button 23 accepts a button operation (a "elevation/lowering operation" according to the present disclosure) by the user. The operation button 23 includes an up button 231 and a down button 232. When the user presses the rise button 231, a rise request is transmitted from the operation unit 2 to the charging station 1 (the charging station selected by the selection button 22). When the user presses down button 232, a down request is transmitted from operation unit 2 to charging station 1.

The operation method of the operation button 23 is not particularly limited. Instead of or in addition to the button type, another type such as a lever type or a touch panel type may be adopted.

Like the controller 13, the controller 24 includes a processor 241 such as a CPU, a memory 242 such as a ROM and a RAM, and a communication module 243 capable of wired communication and/or wireless communication. The controller 24 is configured to exchange information related to a user operation with the charging station 1.

It is not essential to provide the operation unit 2 separately from the charging station 1. The operation unit 2 may be formed integrally with the charging station 1. For example, an operation panel may be provided on the upper surface of the movable unit 11.

The vehicle 9 is an electric vehicle in this example. The vehicle 9 may be any vehicle capable of plug-in charging, and may be, for example, a plug-in hybrid vehicle. The vehicle 9 includes an inlet 91, a charger 92, a battery 93, an inverter 94, and a motor generator 95.

The inlet 91 is disposed inside a cover (not shown) such as a lid provided in an exterior portion of the vehicle 9. The inlet 91 is configured to allow insertion of the charging connector 111 of the charging station 1. When the charging connector 111 is inserted into the inlet 91, the inlet 91 and the charging connector 111 are electrically connected to each other. This enables power transmission from the charging station 1 to the vehicle 9.

When AC power is supplied from the inlet 91, the charger 92 converts the AC power into DC power and supplies the DC power to the battery 93. The battery 93 is a secondary battery such as a nickel-hydrogen battery or a lithium-ion battery.

The inverter 94 converts the DC power stored in the battery 93 into AC power, and supplies the AC power to the motor generator 95. The inverter 94 converts AC power (regenerated power) from the motor generator 95 into DC power, and charges the battery 93 with the DC power. The motor generator 95 receives power from the inverter 94 and applies a rotational force to the driving wheels to cause the vehicle 9 to travel.

<Process Flow>

Figure 4:
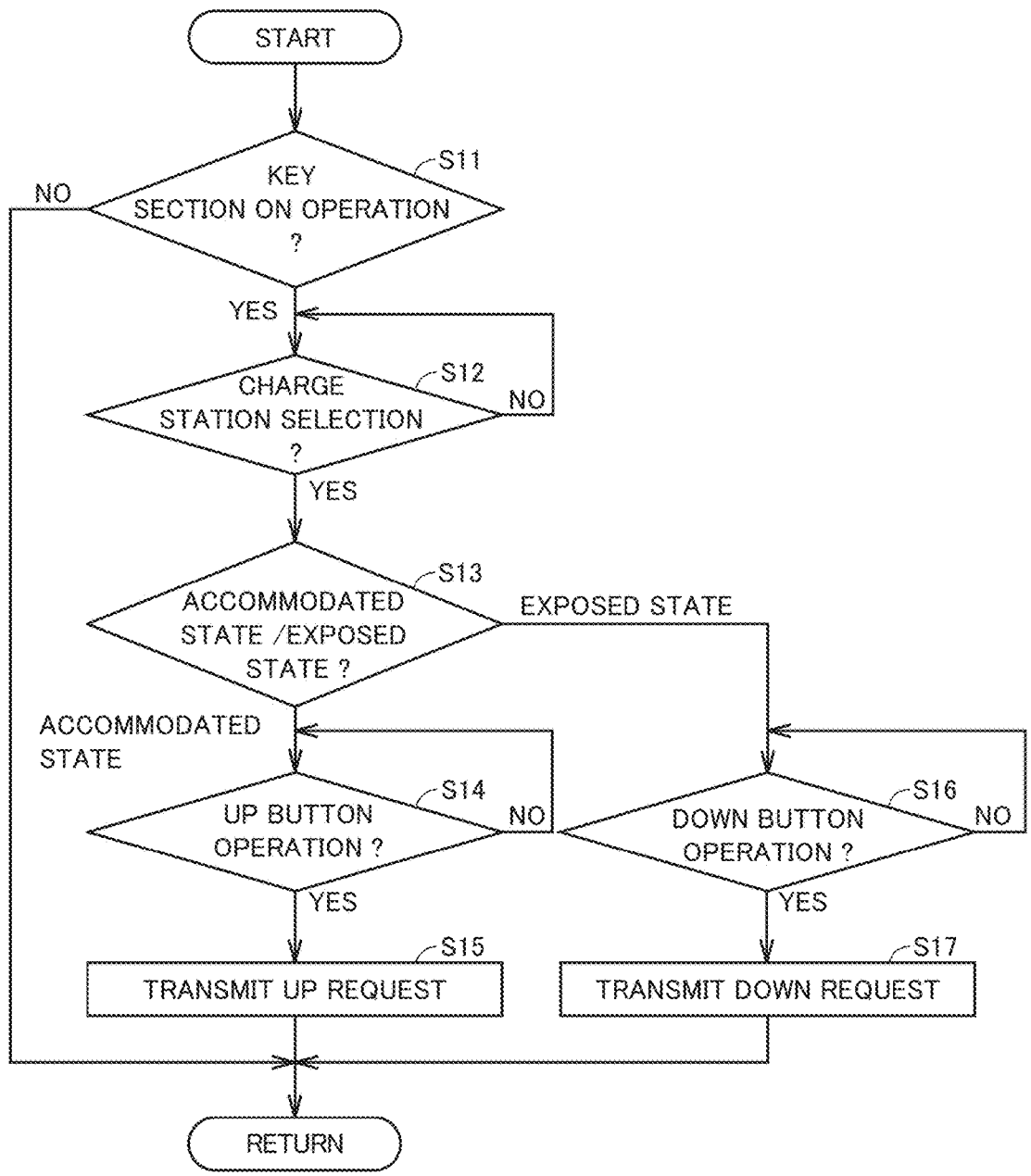
FIG. 4 is a flowchart showing a processing procedure of UP control and DOWN control of a charging station according to the first embodiment.

FIG. 4 is a flowchart showing a processing procedure of UP control and DOWN control of the charging station 1 according to the first embodiment. This flowchart is called from a main routine (not shown) and executed at predetermined intervals, for example. Each step is realized by software processing by the controller 24 of the operation unit 2, but may be realized by hardware (electrical circuit) arranged in the controller 24. Hereinafter, this step is abbreviated as S.

In S11, the controller 24 determines whether or not the user has performed an ON operation on the key portion 21 using the key. When the key portion 21 is not turned on (NO in S11), the controller 24 returns the process to the main routine. When the key portion 21 is turned on (YES in S11), the controller 24 advances the process to S12.

In S12, the controller 24 determines whether or not the user has performed an operation of selecting the charging station 1 on the selection button 22. The controller 24 waits until the user selects the charging station 1 (NO in S12), and when the user selects the charging station 1 (YES in S12), the process proceeds to S13.

In S13, the controller 24 determines whether the charging station 1 selected in S12 is in the accommodated state or the exposed state. When the charging station 1 is in the accommodated state (the accommodated state in S13), the controller 24 advances the process to S14 and waits until the user presses the 1 231 (NO in S14). When the user presses the rise button 231 (YES in S14), the controller 24 transmits a rise request to the selected charging station 1 (S15). Thus, the UP control of the charging station 1 is executed.

On the other hand, when the charging station 1 is in the exposed state in S13 (the exposed state in S13), the controller 24 advances the process to S16 and waits until the user presses the down button 232 (NO in S16). When the user presses down button 232 (YES in S16), controller 24 transmits a down request to selected charging station 1 (S17). Thereby, the downward control of the charging station 1 is executed. When the process of S15 or S17 ends, the controller 24 returns the process to the main routine.

As described above, in the first embodiment, even if the up button 231 or the down button 232 is simply operated, the up request or the down request is not transmitted from the operation unit 2 to the charging station 1. The ascending request and DOWN request are not transmitted unless the user performs an ON operation on the key portion 21. Since an ON operation of the key portion 21 requires a key, an external person who does not have a key cannot operate the key portion 21. Therefore, according to the first embodiment, it is possible to prevent the movable unit 11 from being unnecessarily moved up and down due to a jam or the like of an external person.

Embodiment 2

In the second embodiment, a configuration in which the upward control and the downward control of the charging station 1 are managed using the mobile terminal of the user will be described.

Figure 5:
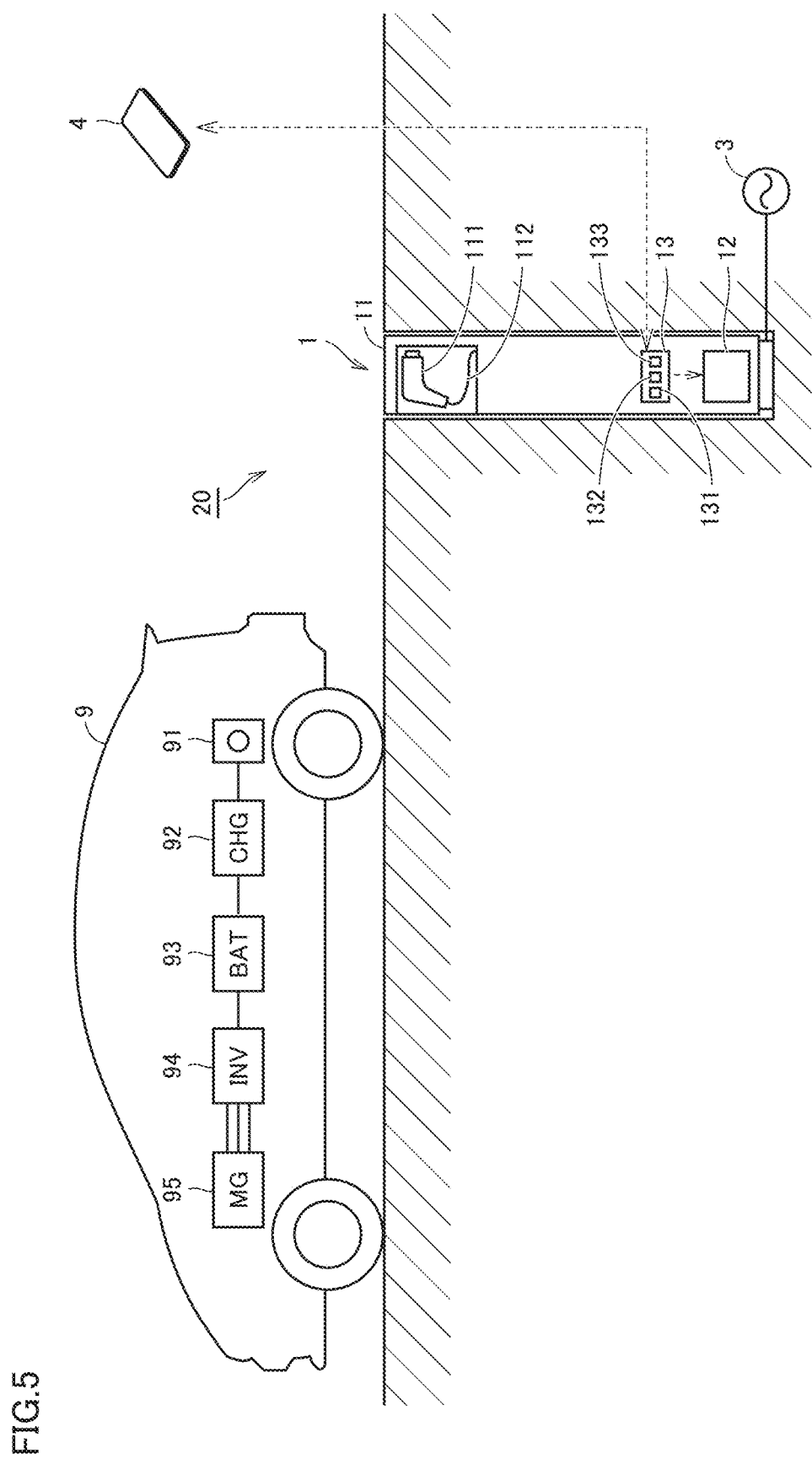
FIG. 5 is a diagram showing an example of a configuration of a charging system of a vehicle according to a second embodiment.

FIG. 5 is a diagram showing an example of a configuration of a charging system of a vehicle according to a second embodiment. The charging system 20 differs from the charging system 10 according to the first embodiment in that the operation unit 2 is not provided. The communication module 133 of the charging station 1 is configured to be capable of communicating with the mobile terminal 4 of the user.

The mobile terminal 4 is, for example, a smartphone, but the type of the mobile terminal 4 is not particularly limited. The mobile terminal 4 may be a tablet terminal, a smart watch, or the like. Application software (app) for operating the charging station 1 is installed in the mobile terminal 4. Using this application, identification information of the mobile terminal 4 and user information (for example, user name, address, payment information of charge fee, etc.) are registered in advance.

Figure 6:
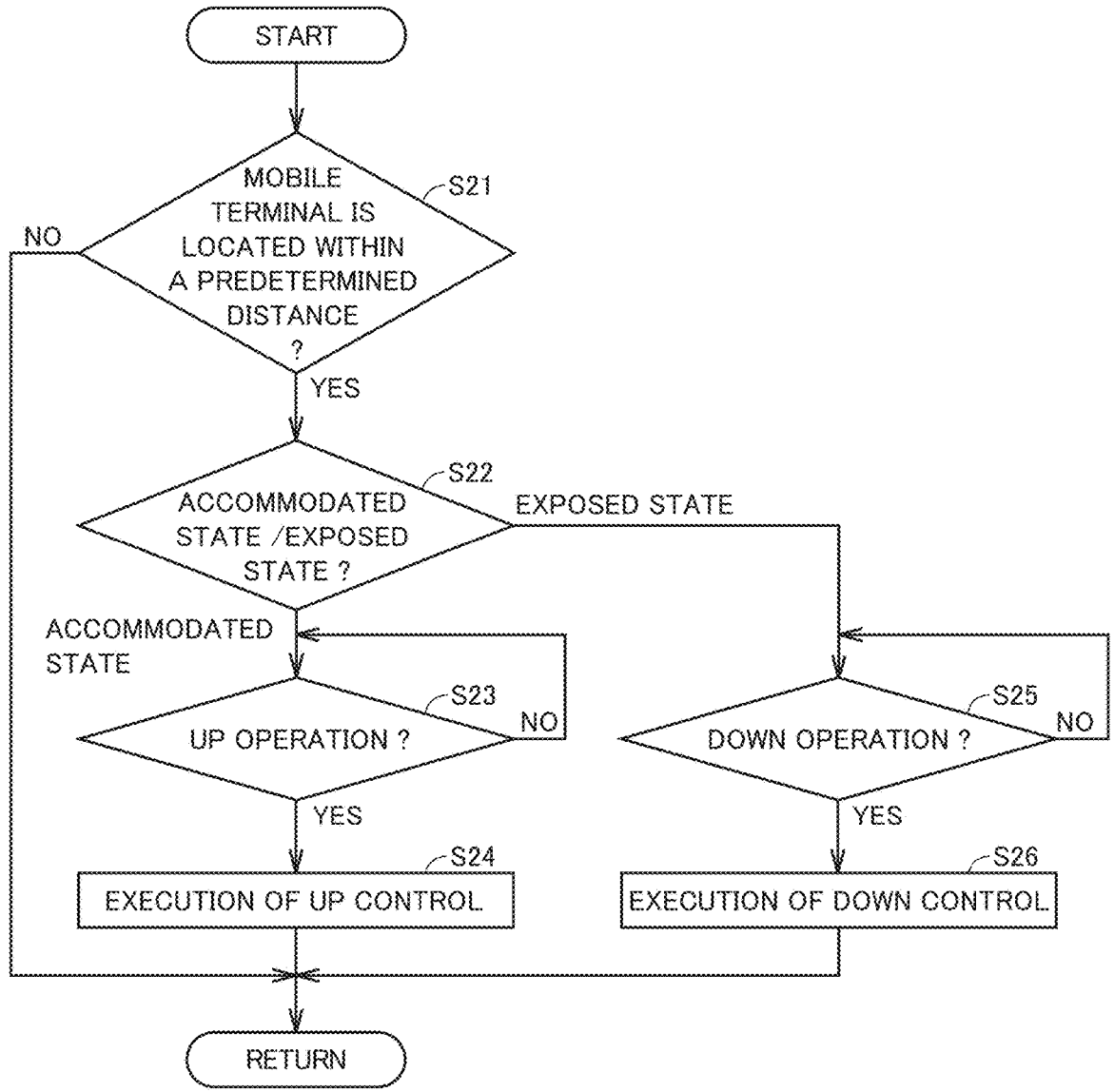
FIG. 6 is a flowchart showing an example of a processing procedure of UP control and DOWN control of a charging station according to the second embodiment.

FIG. 6 is a flowchart showing an example of a processing procedure of UP control and DOWN control of the charging station 1 according to the second embodiment. In this example, for simplicity, it is assumed that the charging station 1 is selected in advance by the user. In the second embodiment, each step is realized by software processing by the controller 13 of the charging station 1. On the other hand, each step may be executed by hardware (electrical circuit) arranged in the controller 13.

In S21, the controller 13 determines whether or not the user's mobile terminal 4 is within a predetermined distance (for example, within several tens of meters) from the charging station 1. The controller 13 can acquire, for example, the mobile terminal 4 GPS(Global Positioning System). The GPS information may be acquired from the mobile terminal 4 or from an external management server (not shown). Alternatively, the controller 13 may determine that the mobile terminal 4 is within a predetermined distance from the charging station 1 when a short-distance communication is established between the controller 13 (communication module 133) and the mobile terminal 4 within a communication distance of several tens of meters.

When the mobile terminal 4 is outside the predetermined distance from the charging station 1 (NO in S21), the controller 13 returns the process to the main routine. When the mobile terminal 4 is within the predetermined distance from the charging station 1 (YES in S21), the controller 13 advances the process to S22.

In S22, the controller 13 determines whether the charging station 1 is in the accommodated state or the exposed state. When the charging station 1 is in the accommodated state (the accommodated state in S22), the controller 13 advances the process to S23, and waits until the user operates the up button (not shown) displayed on the mobile terminal 4 (NO in S23). When the user operates the ascending button (YES in S23), the controller 13 executes UP control (S24).

When the charging station 1 is in the exposed state (the exposed state in S22), the controller 13 advances the process to S25, and waits until the user operates a down button (not shown) displayed on the mobile terminal 4 (NO in S25). When the user operates the DOWN button (YES in S25), the controller 13 executes DOWN control (S26). When the process of S24 or S26 ends, the controller 13 returns the process to the main routine.

Figure 7:
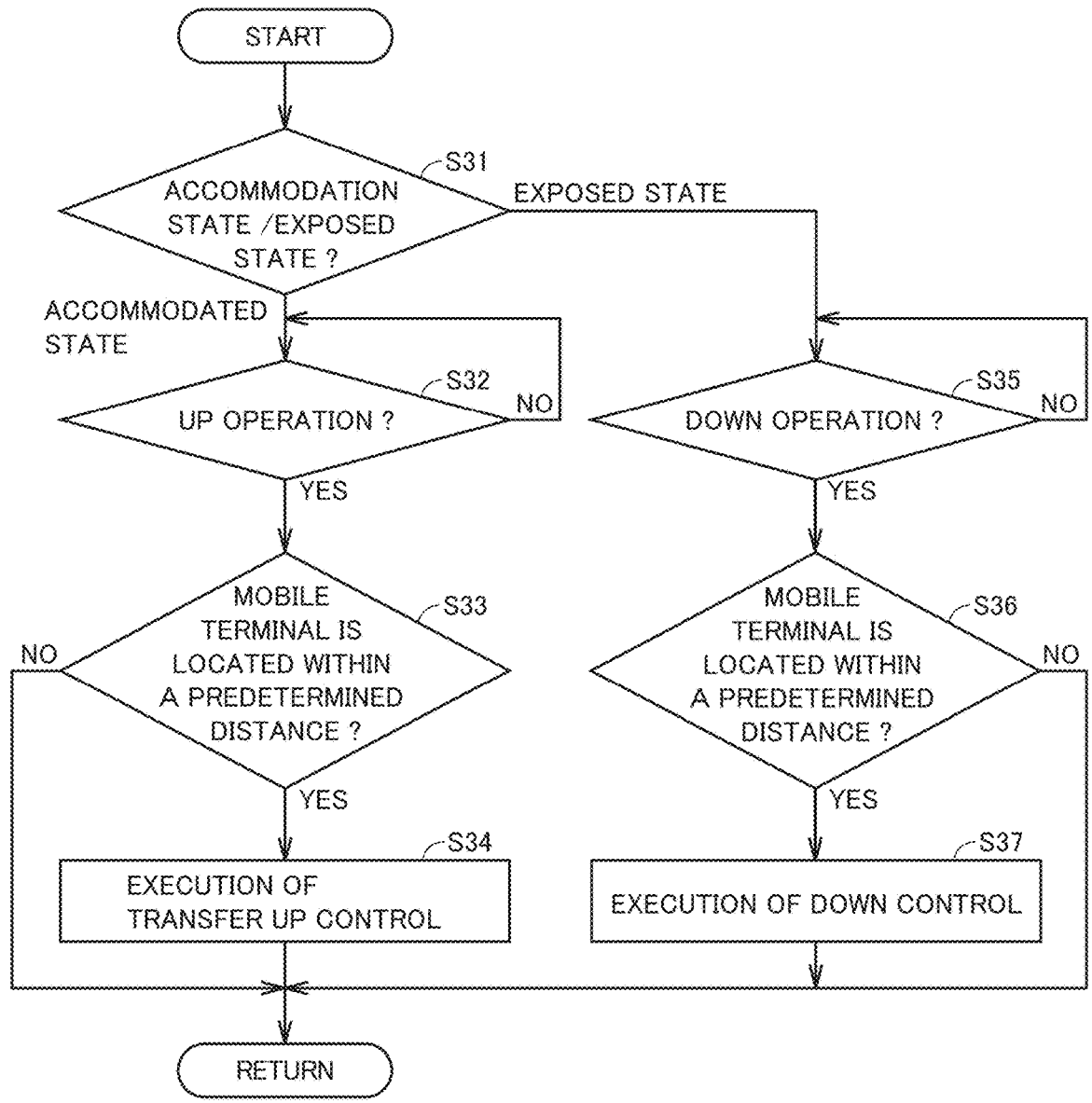
FIG. 7 is a flowchart showing another example of the processing procedure of the UP control and DOWN control of the charging station according to the second embodiment.

FIG. 7 is a flowchart showing another example of the processing procedure of the UP control and DOWN control of the charging station 1 according to the second embodiment. Also in this example, it is assumed that the charging station 1 is selected in advance by the user.

In S31, the controller 13 determines whether the charging station 1 is in the accommodated state or the exposed state. When the charging station 1 is in the accommodated state (the accommodated state in S31), the controller 13 advances the process to S32, and waits until the user operates the up button (not shown) displayed on the mobile terminal 4 (NO in S32).

When the user operates the up button (YES in S32), the controller 13 determines whether or not the mobile terminal 4 is within a predetermined distance from the charging station 1. When the mobile terminal 4 is within the predetermined distance from the charging station 1 (YES in S33), the controller 13 executes the UP control (S34). On the other hand, when the mobile terminal 4 is outside the predetermined distance from the charging station 1 (NO in S33), the controller 13 skips the process of S34. That is, the controller 13 does not execute the UP control even if the ascending button is operated.

When the charging station 1 is in the exposed state (the exposed state in S31), the controller 13 advances the process to S35, and waits until the user operates a down button (not shown) displayed on the mobile terminal 4 (NO in S35).

When the user operates the down button (YES in S35), the controller 13 determines whether or not the mobile terminal 4 is within a predetermined distance from the charging station 1. When the mobile terminal 4 is within the predetermined distance from the charging station 1 (YES in S36), the controller 13 executes DOWN control (S37). On the other hand, when the mobile terminal 4 is outside the predetermined distance from the charging station 1 (NO in S36), the controller 13 skips the process of S37. That is, the controller 13 does not execute the DOWN control even if the DOWN button is operated.

As described above, in the second embodiment, the execution condition of the UP control and DOWN control is that the mobile terminal 4 of the user is within the predetermined distance from the charging station 1. When the mobile terminal 4 is not within the predetermined distance from the charging station 1, the lifting control is not executed even if the lifting button is operated. The same applies to the DOWN control. Since the mobile terminal 4 of the user is registered in advance, an external person who does not have the registered mobile terminal 4 cannot operate the charging station 1. Therefore, according to the second embodiment, it is possible to prevent the movable unit 11 from being unnecessarily moved up and down due to a jam or the like of an external person.

In the second embodiment, the communication module 133 of the controller 13 corresponds to the "communication device" according to the present disclosure.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A charging system for a vehicle, the charging system comprising:
   a movable unit including a power transmitting unit configured to transmit power to the vehicle;
   a lifting device configured to lift up/down the movable unit between an accommodated state in which the movable unit is accommodated under a ground and an exposed state in which the movable unit is exposed on the ground;
   an interface via which information is input and output between a user and the charging system, the interface including a communication device configured to acquire information of an operation on a mobile terminal by the user; and
   a controller configured to control the lifting device to lift up/down the movable unit,
   wherein
   in a first state that (i) the mobile terminal is located within a predetermined distance from the charging system and (ii) the movable unit is in the accommodated state, the controller is configured to, in response to receiving a lifting up operation by the user, control the lifting device to lift up the movable unit from the accommodated state to the exposed state,
   in a second state that (i) the mobile terminal is located outside the predetermined distance from the charging system and (ii) the movable unit is in the accommodated state, the controller is configured to, in response to receiving the lifting up operation, keep the movable unit in the accommodated state,
   in a third state that (i) the mobile terminal is located within the predetermined distance from the charging system and (ii) the movable unit is in the exposed state, the controller is configured to, in response to receiving a lifting down operation by the user, control the lifting device to lift down the movable unit from the exposed state to the accommodated state, and in a fourth state that (i) the mobile terminal is located outside the predetermined distance from the charging system and (ii) the movable unit is in the exposed state, the controller is configured to, in response to receiving the lifting down operation, keep the movable unit in the exposed state.

2. The charging system according to claim 1, wherein the controller is configured to, in response to receiving the lifting down operation or the lifting up operation, determine whether the mobile terminal is located within the predetermined distance from the charging system.

3. The charging system according to claim 2, wherein the controller is configured to, in response to the mobile terminal being located within the predetermined distance from the charging system, control the lifting device to lift up the movable unit from the accommodated state to the exposed state according to the lifting up operation or to lift down the movable unit from the exposed state to the accommodated state according to the lifting down operation.

4. The charging system according to claim 3, wherein the controller is configured to, in response to the mobile terminal being located outside the predetermined distance from the charging system, ignore the lifting down operation and the lifting up operation.

5. A method of controlling a charging system for a vehicle,
the charging system including
a movable unit including a power transmitting unit that transmits power to the vehicle; and
a lifting device that lifts up/down the movable unit between an accommodated state in which the movable unit is accommodated under a ground and an exposed state in which the movable unit is exposed on the ground,
the method comprising:
in a first state that (i) the mobile terminal is located within a predetermined distance from the charging system and (ii) the movable unit is in the accommodated state, lifting up the movable unit from the accommodated state to the exposed state in response to receiving a lifting up operation by the user;

in a second state that (i) the mobile terminal is located outside the predetermined distance from the charging system and (ii) the movable unit is in the accommodated state, keeping the movable unit in the accommodated state in response to receiving the lifting up operation;

in a third state that (i) the mobile terminal is located within the predetermined distance from the charging system and (ii) the movable unit is in the exposed state, lifting down the movable unit from the exposed state to the accommodated state in response to receiving a lifting down operation by the user; and in a fourth state that (i) the mobile terminal is located outside the predetermined distance from the charging system and (ii) the movable unit is in the exposed state, keeping the movable unit in the exposed state in response to receiving the lifting down operation.

6. The method according to claim 5, further comprising:
in response to receiving the lifting down operation or the lifting up operation, determining whether the mobile terminal is located within the predetermined distance from the charging system.

7. The method according to claim 6, further comprising:
in response to the mobile terminal being located within the predetermined distance from the charging system, lifting up the movable unit from the accommodated state to the exposed state according to the lifting up operation or lifting down the movable unit from the exposed state to the accommodated state according to the lifting down operation.

8. The method according to claim 7, further comprising:
in response to the mobile terminal being located outside the predetermined distance from the charging system, ignoring the lifting down operation and the lifting up operation.

* * * * *